(12) United States Patent
Takahashi et al.

(10) Patent No.: US 11,001,239 B2
(45) Date of Patent: May 11, 2021

(54) ELECTRIC BRAKE SYSTEM

(71) Applicant: SHIMANO INC., Sakai (JP)

(72) Inventors: Toshihiko Takahashi, Sakai (JP);
Hitoshi Takayama, Sakai (JP);
Masahiko Fukuda, Sakai (JP);
Masahiro Nakakura, Sakai (JP)

(73) Assignee: SHIMANO INC., Osaka (JP)

( * ) Notice: Subject to any disclaimer, the term of this patent is extended or adjusted under 35 U.S.C. 154(b) by 342 days.

(21) Appl. No.: 16/116,197

(22) Filed: Aug. 29, 2018

(65) Prior Publication Data
US 2019/0061716 A1 Feb. 28, 2019

(30) Foreign Application Priority Data

Aug. 30, 2017 (JP) .............................. JP2017-165854

(51) Int. Cl.
B60T 8/17 (2006.01)
B62L 1/00 (2006.01)
(Continued)

(52) U.S. Cl.
CPC .............. B60T 8/1706 (2013.01); B60T 7/12 (2013.01); B60T 13/741 (2013.01); B60T 17/221 (2013.01); B62J 99/00 (2013.01); B62L 1/00 (2013.01); B62L 1/005 (2013.01); B62L 3/02 (2013.01); B62M 6/55 (2013.01); F16D 55/2245 (2013.01); F16D 65/183 (2013.01); B60T 8/3225 (2013.01); B60T 8/3255 (2013.01);
(Continued)

(58) Field of Classification Search
CPC .... B60T 8/1706; B60T 8/3225; B60T 17/221; B60T 7/12; B62L 3/02; B62L 1/00; B62J 99/00; B62M 6/55
See application file for complete search history.

(56) References Cited

U.S. PATENT DOCUMENTS 5,803,211 A * 9/1998 Wilke ................... B60T 13/743
 188/173
6,227,626 B1 * 5/2001 Blattert ................. B60T 13/741
 303/20
(Continued)

FOREIGN PATENT DOCUMENTS

CN 204606020 U 9/2015
CN 205401520 U 7/2016
(Continued)

OTHER PUBLICATIONS

Feb. 1, 2021 Office Action issued in Chinese Patent Application No. 201811003660.X.

Primary Examiner — Vishal R Sahni
(74) Attorney, Agent, or Firm — Oliff PLC

(57) ABSTRACT

An electric brake system that appropriately brakes a rotary body of a human powered vehicle in various situations is applicable to a human powered vehicle and includes a brake device including an electric actuator operated by electric power from a power supply, and a braking portion driven by the electric actuator to brake a rotary body of the human powered vehicle, a state detector detecting a state of the human powered vehicle other than an operation of the brake device performed by a user, and a control unit controlling the brake device so that the braking portion brakes the rotary body based on a detection result of the state detector.

19 Claims, 4 Drawing Sheets

(51) Int. Cl.
*B60T 13/74* (2006.01)
*F16D 55/224* (2006.01)
*F16D 65/18* (2006.01)
*B60T 7/12* (2006.01)
*B60T 17/22* (2006.01)
*B62J 99/00* (2020.01)
*B62L 3/02* (2006.01)
*B62M 6/55* (2010.01)
*F16D 125/40* (2012.01)
*B61H 1/00* (2006.01)
*B60T 8/32* (2006.01)
*F16D 121/24* (2012.01)
*B62J 45/00* (2020.01)

(52) U.S. Cl.
CPC ............... *B61H 1/00* (2013.01); *B62J 45/00* (2020.02); *F16D 2121/24* (2013.01); *F16D 2125/40* (2013.01)

(56) References Cited

U.S. PATENT DOCUMENTS

| | | | | |
|---|---|---|---|---|
| 8,069,962 | B1 * | 12/2011 | Semsey | F16D 65/18 188/72.9 |
| 8,485,321 | B2 * | 7/2013 | Castro | B60T 13/741 188/24.22 |
| 8,548,708 | B2 * | 10/2013 | Strengert | B60T 17/221 701/70 |
| 8,899,384 | B2 * | 12/2014 | Castro | B60T 13/741 188/24.22 |
| 2002/0158511 | A1 | 10/2002 | Baumgartner et al. | |
| 2004/0231905 | A1 * | 11/2004 | Kurita | B60L 15/2009 180/206.5 |
| 2008/0114519 | A1 * | 5/2008 | DuFaux | B60T 7/16 701/70 |
| 2008/0190717 | A1 * | 8/2008 | Baumann | F16D 65/54 188/156 |
| 2009/0150034 | A1 * | 6/2009 | Ezoe | B60T 7/22 701/53 |
| 2010/0147633 | A1 * | 6/2010 | Kim | B60T 13/741 188/72.7 |
| 2011/0001442 | A1 * | 1/2011 | Lee | B62M 6/45 318/139 |
| 2011/0139555 | A1 * | 6/2011 | Hori | F16D 65/18 188/72.1 |
| 2015/0265490 | A1 * | 9/2015 | Cestari Soto | A61G 5/14 297/5 |
| 2016/0096549 | A1 * | 4/2016 | Herzog | B62D 13/06 701/41 |
| 2017/0151999 | A1 * | 6/2017 | Kinpara | B62K 11/04 |
| 2017/0176988 | A1 * | 6/2017 | Noessner | G05D 1/0214 |
| 2017/0182984 | A1 | 6/2017 | Matsuda | |
| 2017/0291585 | A1 * | 10/2017 | Kobune | B60T 13/741 |
| 2017/0341704 | A1 * | 11/2017 | Bobinger | B62K 3/002 |
| 2018/0257743 | A1 * | 9/2018 | Tsuchizawa | B62J 99/00 |
| 2019/0061711 | A1 * | 2/2019 | Takahashi | B60T 1/065 |

FOREIGN PATENT DOCUMENTS

| | | |
|---|---|---|
| CN | 106715216 A | 5/2017 |
| CN | 107264494 | * 10/2017 |
| JP | 2002276407 | * 9/2002 |

* cited by examiner

ELECTRIC BRAKE SYSTEM

BACKGROUND

An electric brake system including a brake device that includes an electric actuator operated by electric power and a braking portion driven by the electric actuator to brake a rotary body of a human powered vehicle is disclosed in Japanese Laid-Open Patent Publication No. 2017-30395 as an electric brake system applied to a human powered vehicle.

SUMMARY

It is preferred that a brake be appropriately applied to a rotary body of a human powered vehicle in various situations.

An electric brake system according to a first aspect of one or more exemplary embodiments is applicable to a human powered vehicle and includes a brake device including an electric actuator operated by electric power from a power supply, and a braking portion driven by the electric actuator to brake a rotary body of the human powered vehicle, a state detector detecting a state of the human powered vehicle other than an operation of the brake device performed by a user, and a control unit controlling the brake device so that the braking portion brakes the rotary body based on a detection result of the state detector.

The brake device can be driven by an operation other than an operation intentionally performed by a user. Thus, it is possible to brake the rotary body of the human powered vehicle appropriately in various situations.

In accordance with a second aspect of one or more exemplary embodiments, the electric brake system according to the first aspect is configured so that the control unit controls the brake device to brake the rotary body rotating at a rotation speed that is higher than or equal to a predetermined rotation speed based on the detection result of the state detector.

Thus, in a case where the rotation speed of the rotary body is lower than the predetermined speed, the user can move the human powered vehicle. This ensures the convenience of the user.

In accordance with a third aspect of one or more exemplary embodiments, the electric brake system according to the first or second aspect is configured so that the control unit controls the brake device so that a rotation speed of the rotary body is reduced in a stepped manner based on the detection result of the state detector.

This prevents a quick reduction in the rotation speed of the rotary body.

In accordance with a fourth aspect of one or more exemplary embodiments, the electric brake system according to any one of the first to third aspects is configured so that the braking portion includes a friction member pressed against the rotary body.

Thus, it is possible to easily brake the rotary body of the human powered vehicle.

In accordance with a fifth aspect of one or more exemplary embodiments, the electric brake system according to the fourth aspect is configured so that the friction member includes a first friction member and a second friction member arranged to face the first friction member with the rotary body disposed between the first friction member and the second friction member, and the braking portion further includes a first forward-reverse mechanism moving the first friction member forwardly and reversely with respect to the rotary body.

Thus, the first friction member is easily pressed against the rotary body.

In accordance with a sixth aspect of one or more exemplary embodiments, the electric brake system according to the fifth aspect is configured so that the braking portion further includes a second forward-reverse mechanism moving the second friction member forwardly and reversely with respect to the rotary body.

Thus, the second friction member is easily pressed against the rotary body.

In accordance with a seventh aspect of one or more exemplary embodiments, the electric brake system according to any one of the first to sixth aspects is configured so that the state detector detects a state related to output of the power supply.

Thus, it is possible to brake the rotary body of the human powered vehicle appropriately in accordance with the power supply state of the power supply.

In accordance with an eighth aspect of one or more exemplary embodiments, the electric brake system according to any one of the first to seventh aspects further includes a power supply supplying electric power to the electric actuator and a power storage provided separately from the power supply to supply electric power to the electric actuator.

According to this configuration, the electric actuator is driven using electric power of the power storage in accordance with the power supply state of the power supply. Thus, it is possible to brake the rotary body of the human powered vehicle appropriately in various situations.

In accordance with a ninth aspect of one or more exemplary embodiments, the electric brake system according to the eighth aspect further includes a charge controller controlling a charge state of the power storage so that the power storage maintains a state capable of supplying a predetermined electric power to the electric actuator.

Thus, the brake device is maintained in a drivable state.

In accordance with a tenth aspect of one or more exemplary embodiments, the electric brake system according to the eighth or ninth aspect is configured so that the power supply includes a rechargeable battery.

Thus, the configuration of the power supply is simplified.

In accordance with an eleventh aspect of one or more exemplary embodiments, the electric brake system according to the eighth or ninth aspect is configured so that the power supply includes an electric power generator generating electric power in accordance with traveling of the human powered vehicle.

According to this configuration, external electric power does not need to be supplied. Thus, the configuration of the power supply is simplified.

In accordance with a twelfth aspect of one or more exemplary embodiments, the electric brake system according to any one of the eighth to eleventh aspects is configured so that the brake device further includes a base provided with at least one of the electric actuator, the braking portion, and the power storage.

Thus, the configuration of the power supply is simplified. Additionally, electric power of the power storage is easily supplied to the electric actuator.

In accordance with a thirteenth aspect of one or more exemplary embodiments, the electric brake system according to any one of the first to seventh aspects further includes a power supply configured to supply electric power to the electric actuator and a further device other than the electric actuator.

According to this configuration, the control unit controls electric power supplied from the power supply to the brake device and the further device based on the detection result of the state detector. Thus, it is possible to brake the rotary body of the human powered vehicle appropriately in various situations.

In accordance with a fourteenth aspect of one or more exemplary embodiments, the electric brake system according to the thirteenth aspect is configured so that the further device includes an assist device assisting propulsion of the human powered vehicle.

Thus, in a human powered vehicle including an assist device, it is possible to brake the rotary body of the human powered vehicle appropriately in various situations.

In accordance with a fifteenth aspect of one or more exemplary embodiments, the electric brake system according to any one of the first to fourteenth aspects is configured so that the rotary body is a rotor provided on a wheel of the human powered vehicle.

Thus, it is possible to effectively brake the wheel of the human powered vehicle.

In accordance with a sixteenth aspect of one or more exemplary embodiments, the electric brake system according to any one of the first to fifteenth aspects is configured so that the brake device includes a maintenance mechanism maintaining a brake on the rotary body in a state where driving of the braking portion by the electric actuator is stopped.

Thus, the brake on the rotary body applied by the brake device is easily maintained.

In accordance with a seventeenth aspect of one or more exemplary embodiments, the electric brake system according to the sixteenth aspect is configured so that the maintenance mechanism is configured to be manually set from a first state in which a braking force on the rotary body is maintained by the braking portion to a second state in which the braking force applied by the braking portion to the rotary body is released.

Thus, the maintenance mechanism is easily changed from the first state to the second state.

In accordance with an eighteenth aspect of one or more exemplary embodiments, the electric brake system according to the sixteenth or seventeenth aspect is configured so that the maintenance mechanism is configured to restrict driving of the braking portion caused by input from the rotary body.

Thus, the configuration of the maintenance mechanism is simplified.

In accordance with a nineteenth aspect of one or more exemplary embodiments, the electric brake system according to any one of the first to eighteenth aspects further includes a notification device reporting a braking operation of the braking portion performed on the rotary body based on control of the control unit.

This allows the user to easily recognize that the brake is applied to the rotary body.

With the electric brake system according to one or more of the exemplary embodiments described herein, it is possible to brake a rotary body of a human powered vehicle appropriately in various situations.

DETAILED DESCRIPTION OF EXEMPLARY EMBODIMENTS

The following description related to each exemplary embodiment exemplifies, without any intention to limit, applicable forms of a brake device and an electric brake system. It will be apparent to the skilled artisan from this disclosure that the following descriptions of exemplary embodiments are provided as examples only and need not limit the broad inventive principles described herein or included in the appended claims. The brake device and the electric brake system described herein can be applicable to a form different from the exemplary embodiments such as modified examples of the exemplary embodiments and combinations of at least two of the modified examples that do not contradict each other.

Figure 1:
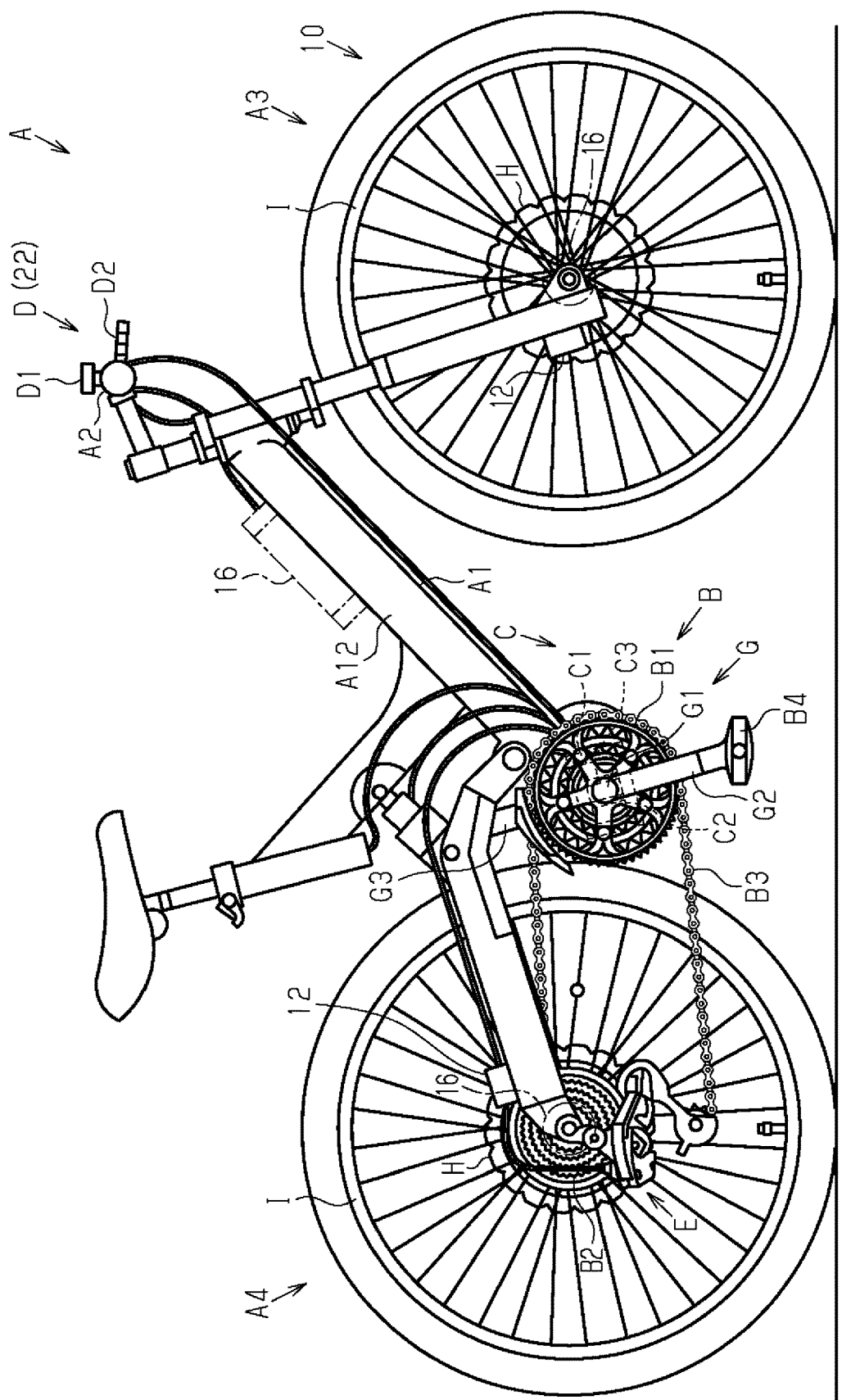
FIG. 1 is a side view of a vehicle to which a first embodiment of an electric brake system is applied.

FIG. 1 shows a human powered vehicle A to which one exemplary embodiment of an electric brake system 10 is applied. The human powered vehicle A is a city cycle that includes an assist device C assisting propulsion of the human powered vehicle A using electric energy. The configuration of the human powered vehicle A can be changed to any configuration. The human powered vehicle A can be configured without the assist device C. The type of the human powered vehicle A can be a road bike, a mountain bike, or a cross bike. As shown in FIG. 1, the human powered vehicle A includes a body A1, a handlebar A2, a wheel A3 (front wheel A3), a wheel A4 (rear wheel A4), a drive mechanism B, the assist device C, an operating device D, an external shifting device E, and the electric brake system 10. The human powered vehicle A further includes a torque sensor and a vehicle speed sensor (not shown). The body A1 includes a frame A12.

The drive mechanism B transmits human power to the rear wheel A4. The drive mechanism B is configured to be a chain drive type and includes a front sprocket B1, a rear sprocket B2, a chain B3, a crank mechanism G, and a pair of pedals B4. The drive mechanism B can be selected from any type and can be a belt drive type or a shaft drive type.

The crank mechanism G includes a crankshaft G1, a right crank G2, and a left crank G3. The crankshaft G1 is rotatably supported by a bottom bracket provided on the frame A12. The right crank G2 and the left crank G3 are coupled to the crankshaft G1. One of the pair of pedals B4 is rotatably supported by the right crank G2. The other (not shown) of the pair of pedals B4 is rotatably supported by the left crank G3.

The front sprocket B1 is coupled to the crankshaft G1. The crankshaft G1 and the front sprocket B1 are coaxial. Any structure related to the coupling of the crankshaft G1 and the front sprocket B1 can be selected. A one-way clutch (not shown) is provided between the crankshaft G1 and the front sprocket B1. The one-way clutch transmits rotation of the crankshaft G1 to the front sprocket B1 in a case where the crankshaft G1 is rotating forward at a rotation speed that is higher than a rotation speed of the front sprocket B1. The front sprocket B1 and the crankshaft G1 can be coupled so as not to rotate relative to each other as necessary.

The rear sprocket B2 is rotatably supported by the rear wheel A4. The chain B3 runs around the front sprocket B1 and the rear sprocket B2. In a case where the crankshaft G1 and the front sprocket B1 are rotated forward by human power applied to the pair of pedals B4, the rear wheel A4 is rotated forward by the human power transmitted via the chain B3 and the rear sprocket B2.

The assist device C includes an assist motor C1, a drive circuit C2, a speed reduction unit C3, and a one-way clutch (not shown). The assist device C assists propulsion of the human powered vehicle A by transmitting torque to the front sprocket B1. The torque sensor outputs a signal corresponding to torque applied to a detection subject. The detection subject of the torque sensor is, for example, the crankshaft G1 or the pedals B4. In a case where the detection subject is the crankshaft G1 or the pedals B4, the torque sensor outputs a signal corresponding to human power applied to the crankshaft G1 or the pedals B4. Any specific configuration of the torque sensor can be selected. The torque sensor includes a strain sensor, a magnetostriction sensor, an optical sensor, or a pressure sensor.

The operating device D includes an operating portion D1 and an operating portion D2 operated by the user. The operating portion D1 is one or multiple buttons. The operating portion D2 is an operating lever. The operating device D is connected to communicate with the external shifting device E, the assist device C, and the electric brake system 10 so that a signal corresponding to an operation of at least one of the operating portion D1 and the operating portion D2 is transmitted to the external shifting device E, the assist device C, and the electric brake system 10. The operating device D is connected to communicate with the external shifting device E, the assist device C, and the electric brake system 10 by a wire configured to perform power line communication (PLC) or a communication line. Alternatively, the operating device D can be connected to communicate with the external shifting device E, the assist device C, and the electric brake system 10 by a wireless communication unit configured to perform wireless communication. In a case where the operating portion D1 is operated, a signal for changing an assist mode of the assist device C is transmitted to the assist device C, and the assist mode of the assist mechanism is changed in accordance with the signal. In a case where the operating portion D2 is operated, a signal for braking at least one of the front wheel A3 and the rear wheel A4 is transmitted to a control unit 14 (refer to FIG. 2) of the electric brake system 10, and a brake device 12 is operated in accordance with the signal.

Figure 2:
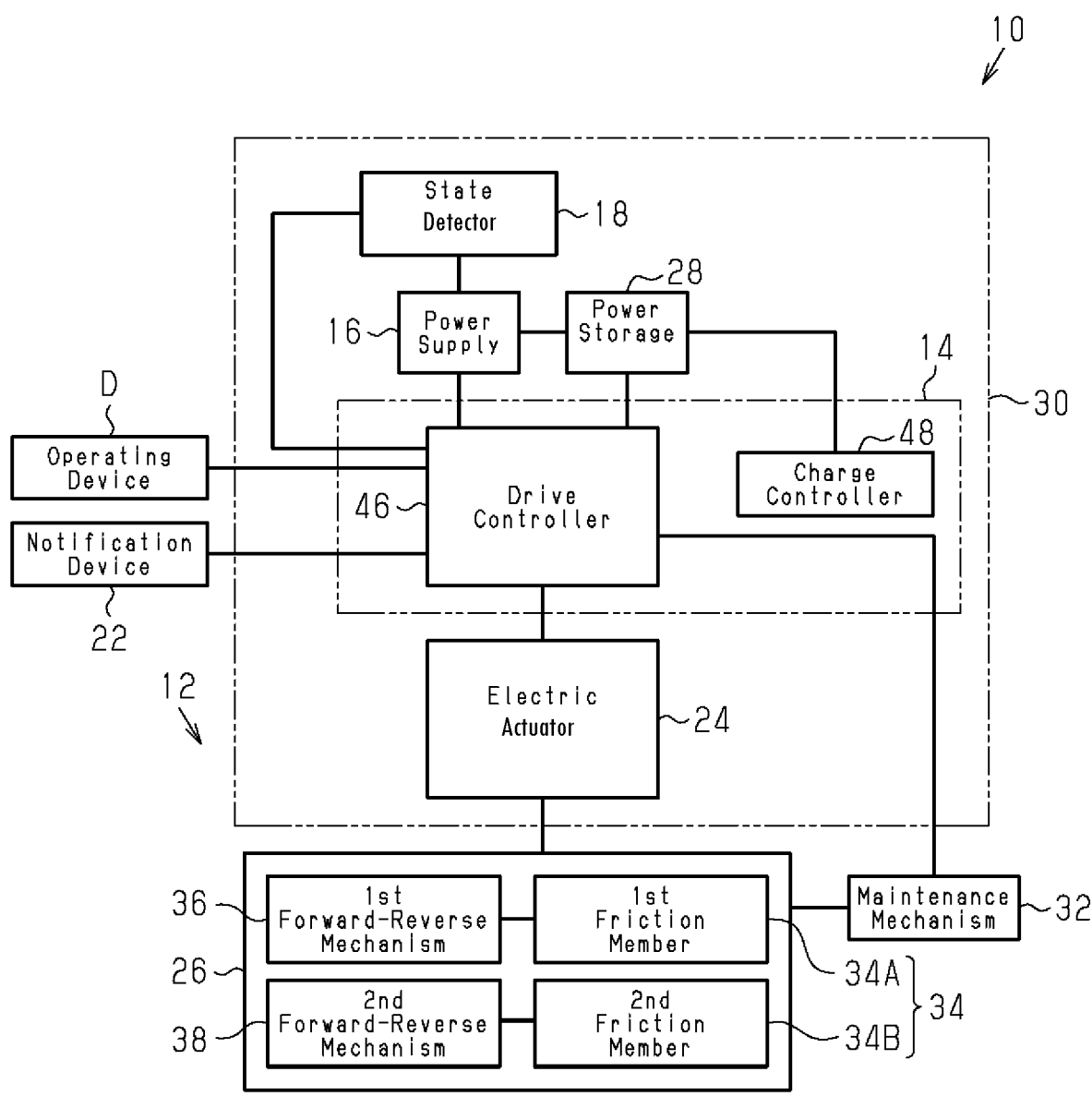
FIG. 2 is a block diagram showing the electric brake system of FIG. 1.

As shown in FIG. 2, the electric brake system 10 includes the brake device 12, the control unit 14, and a state detector 18. Preferably, the electric brake system 10 includes a power supply 16 and a notification device 22.

The brake device 12 is applicable to the human powered vehicle A. Any type of the brake device 12 can be selected. In the present embodiment, the brake device 12 is a disc brake device that brakes rotary body H (refer to FIG. 1) of the human powered vehicle A, and the rotary body H is a rotor provided on each of the front wheel A3 and the rear wheel A4 of the human powered vehicle A. The brake device 12 can be a rim brake device that brakes a rim I (refer to FIG. 1) of each of the front wheel A3 and the rear wheel A4 of the human powered vehicle A. The brake device 12 shown in FIG. 2 includes an electric actuator 24, a braking portion 26, and a power storage 28. Preferably, the brake device 12 includes a base 30 and a maintenance mechanism 32.

The electric actuator 24 is operated by electric power from the power supply 16. In the present embodiment, the electric actuator 24 is an electric motor. The electric actuator 24 is connected to the braking portion 26. The braking portion 26 is driven by the electric actuator 24 to brake the rotary body H (refer to FIG. 1) of the human powered vehicle A.

Figure 3:
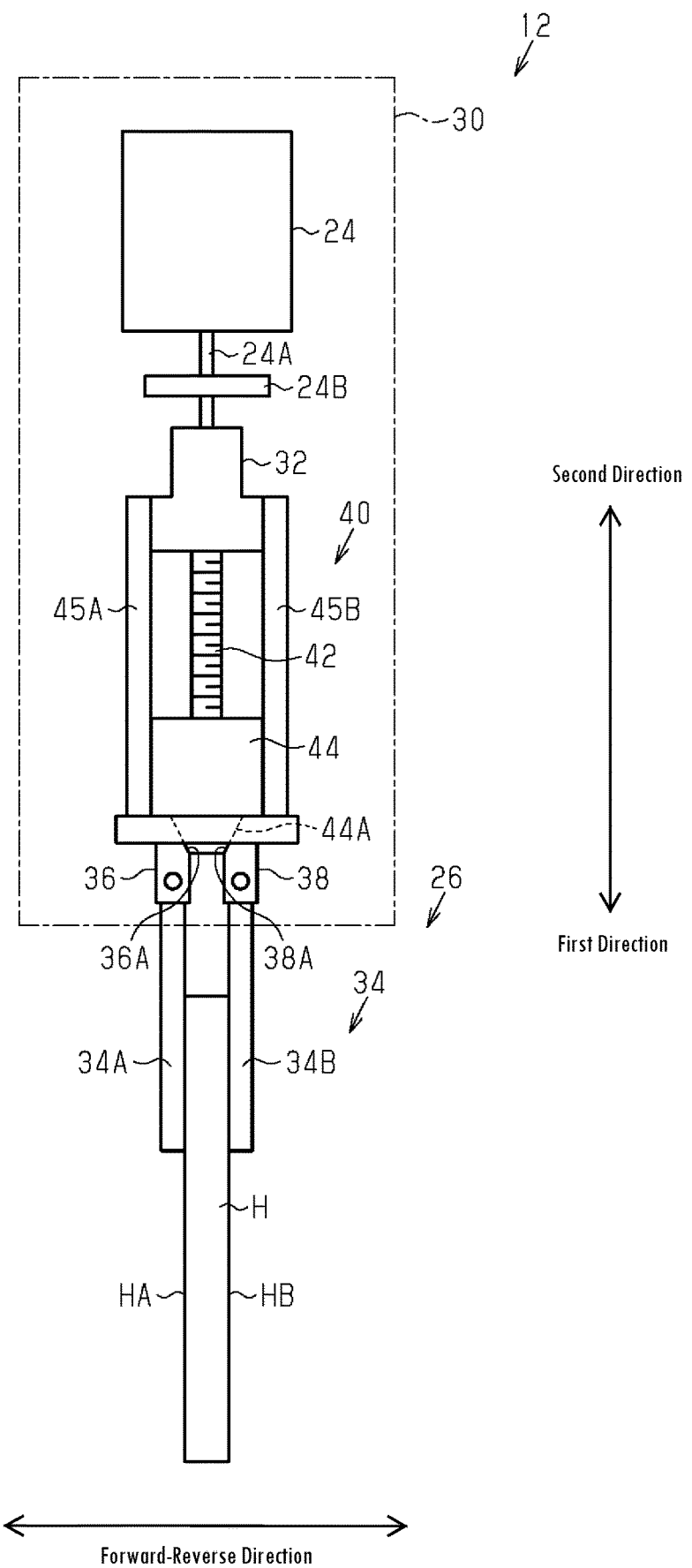
FIG. 3 is a diagram showing a maintenance mechanism of FIG. 2 in a first state.

As shown in FIG. 3, the braking portion 26 includes a friction member 34, a first forward-reverse mechanism 36, a second forward-reverse mechanism 38, and a force transmission mechanism 40. The friction member 34 is pressed against the rotary body H by the forward-reverse mechanisms 36 and 38. Thus, the brake is easily applied to the rotary body H of the human powered vehicle A. In the present embodiment, the friction member 34 includes disc brake pads. The friction member 34 includes a first friction member 34A and a second friction member 34B. The first friction member 34A is arranged to face one surface HA of the rotary body H. The first friction member 34A brakes the rotary body H by being pressed against the one surface HA of the rotary body H by the first forward-reverse mechanism 36. The second friction member 34B is arranged to face the other surface HB of the rotary body H. Additionally, the second friction member 34B is arranged to face the first friction member 34A with the rotary body H disposed therebetween. The second friction member 34B brakes the rotary body H by being pressed against the other surface HB of the rotary body H by the second forward-reverse mechanism 38.

The first forward-reverse mechanism 36 moves the first friction member 34A forwardly and reversely with respect to the rotary body H. (Here, forward and reverse refer to a direction along an axis of the rotary body H and do not correspond to the travel direction of the human powered vehicle A.) Thus, the first friction member 34A is easily pressed against the rotary body H. The second forward-reverse mechanism 38 moves the second friction member 34B forwardly and reversely with respect to the rotary body H. Thus, the second friction member 34B is easily pressed against the rotary body H. In the present embodiment, the first forward-reverse mechanism 36 and the second forward-reverse mechanism 38 are rotatably provided on the base 30 (housing). The first forward-reverse mechanism 36 is biased by a biasing member (not shown) in a direction in which the first friction member 34A separates away from the rotary body H. The second forward-reverse mechanism 38 is biased by a biasing member (not shown) in a direction in which the second friction member 34B separates away from the rotary body H.

The force transmission mechanism 40 couples the electric actuator 24 to the first forward-reverse mechanism 36 and the second forward-reverse mechanism 38. The force transmission mechanism 40 includes a bolt 42, a moving member 44, and guide members 45A and 45B. The bolt 42 is coupled to an output shaft 24A of the electric actuator 24 via the maintenance mechanism 32. The bolt 42 is inserted into the moving member 44. Rotation of the moving member 44 in accordance with rotation of the bolt 42 is restricted by the guide members 45A and 45B. The moving member 44 is guided by the guide members 45A and 45B to move in an axial direction of the bolt 42 in accordance with rotation of the bolt 42. More specifically, the force transmission mechanism 40 is configured to be a ball screw that converts rotational motion of the electric actuator 24, which is an electric motor, into linear motion of the moving member 44.

Figure 4:
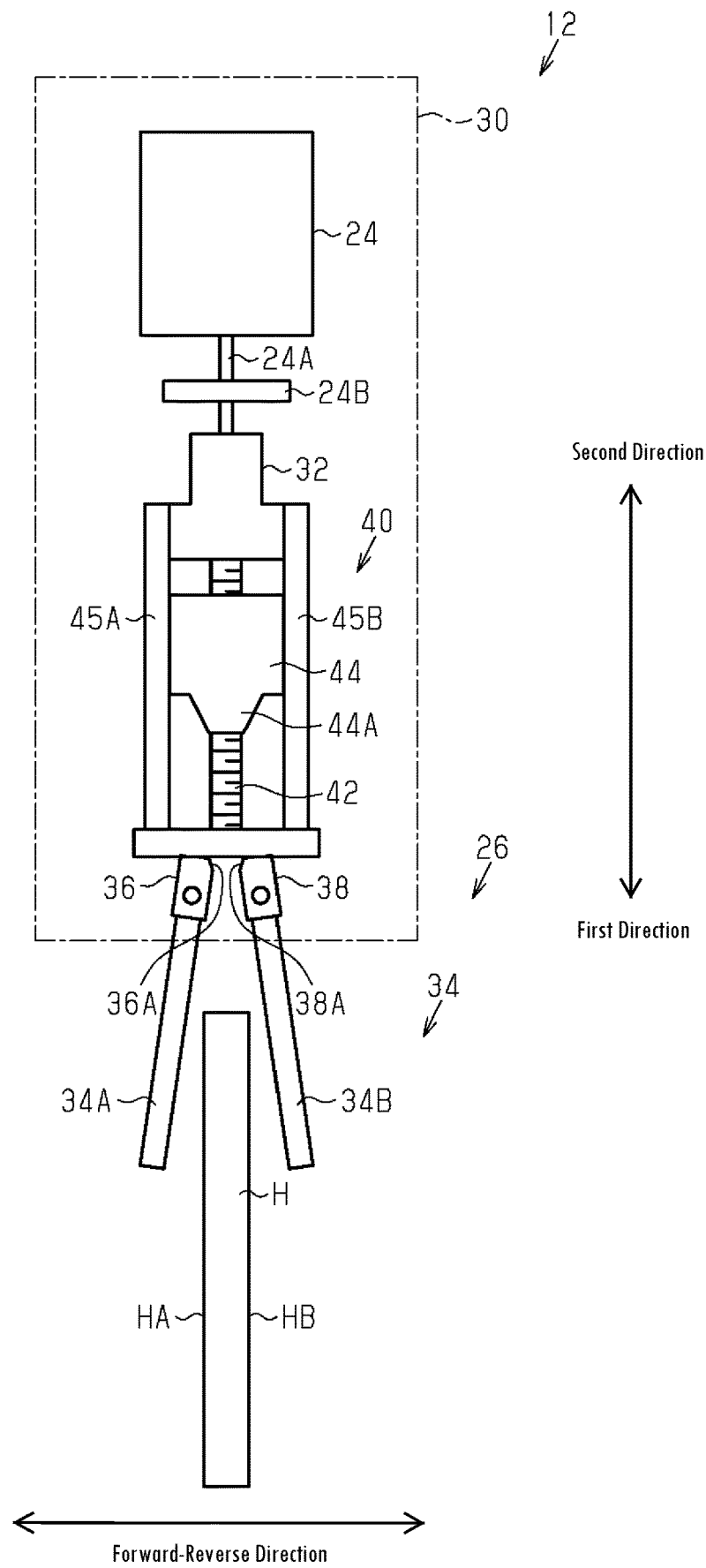
FIG. 4 is a diagram showing the maintenance mechanism of FIG. 2 in a second state.

The moving member 44 is arranged to push the first forward-reverse mechanism 36 and the second forward-reverse mechanism 38. An end portion 44A of the moving member 44 is wedge-shaped. The first forward-reverse mechanism 36 includes a contact portion 36A having a shape corresponding to the end portion 44A. The second forward-reverse mechanism 38 includes a contact portion 38A having a shape corresponding to the end portion 44A. Rotation of the bolt 42 in a first direction moves the moving member 44 toward the first forward-reverse mechanism 36 and the second forward-reverse mechanism 38 in the axial direction of the bolt 42. The end portion 44A of the moving member 44 contacts the contact portions 36A and 38A to pivot the first forward-reverse mechanism 36 and the second forward-reverse mechanism 38 against the biasing force of the biasing members. As a result, as shown in FIG. 3, the first friction member 34A and the second friction member 34B are pressed against the rotary body H, braking the rotary body H. Rotation of the bolt 42 in a second direction that is opposite to the first direction moves the moving member 44 away from the first forward-reverse mechanism 36 and the second forward-reverse mechanism 38 in the axial direction of the bolt 42. As a result, as shown in FIG. 4, the biasing force of the biasing members pivots the first forward-reverse mechanism 36 and the second forward-reverse mechanism 38 so that the first friction member 34A and the second friction member 34B separate from the rotary body H.

The power storage 28 shown in FIG. 2 is provided separately from the power supply 16 to supply electric power to the electric actuator 24. The power storage 28 includes a storage battery or a capacitor. The storage battery is a lead storage battery, a nickel-metal hydride battery, or a lithium-ion battery. The power storage 28 is connected to the control unit 14 and the power supply 16. The power storage 28 stores electric power supplied from, for example, the power supply 16.

The base 30 is provided with the electric actuator 24, the braking portion 26, and the power storage 28. The base 30 is a case configured to accommodate the control unit 14, the power supply 16, the electric actuator 24, the power storage 28, and the state detector 18. Thus, the power supply 16, the electric actuator 24, the power storage 28, and the state detector 18 are protected.

The power supply 16 supplies electric power to the electric actuator 24 and the power storage 28. Any configuration of the power supply 16 can be selected. For example, the power supply 16 includes a rechargeable battery. In a case where the power supply 16 is a rechargeable battery, as shown in FIG. 1 by the single-dashed lines, the power supply 16 is arranged on any position of the body A1. Additionally, for example, the power supply 16 includes an electric power generator that generates electric power in accordance with traveling of the human powered vehicle A. One example of the electric power generator is a dynamo. In a case where the power supply 16 is an electric power generator (dynamo), the power supply 16 is, for example, a hub dynamo provided on the front wheel A3.

The state detector 18 detects a state of the human powered vehicle A other than an operation of the brake device 12 performed by the user. The state detector 18 detects a state related to output of the power supply 16 (hereafter, referred to as "output state"). Any specific content of the output state detected by the state detector 18 can be selected. In the present embodiment, the state detector 18 detects the voltage of the power supply 16. In a case where the state detector 18 detects an abnormality of the power supply 16 based on variations in the voltage of the power supply 16, the state detector 18 sends an abnormal signal to a drive controller 46 of the control unit 14. The state detector 18 can be configured to detect a charge-discharge amount of the power supply 16. In this case, if the state detector 18 detects an abnormality of the power supply 16 based on the charge-discharge amount of the power supply 16, the state detector 18 sends an abnormal signal to the drive controller 46 of the control unit 14. With no limit to the detection of the output state, any device that detects a state of the human powered vehicle A other than the operation of the brake device 12 can be used as the state detector. For example, a device that detects a communication state of an electrical component or a device that detects a travel state of the human powered vehicle A such as speed, acceleration, cadence, or inclination can be used as the state detector.

In the present embodiment, the control unit 14 is a central processing unit (CPU) or a micro processing unit (MPU). The CPU or MPU configured to be the control unit 14 also functions as the drive controller 46 and a charge controller 48. Any specific configuration of the control unit 14, the drive controller 46, and the charge controller 48 can be selected. For example, separate CPUs or MPUs can be prepared as each of the control unit 14, the drive controller 46, and the charge controller 48. Alternatively, two CPUs or MPUs can be prepared, and the functions of the control unit 14, the drive controller 46, and the charge controller 48 can be divided between the two CPUs or MPUs. The mount location of a CPU or MPU configured to be the control unit 14, the drive controller 46, and the charge controller 48 is not limited to the base 30 and can be any location.

The drive controller 46 performs normal control and emergency control. Normal control is performed based on a signal from the operating portion D2 (refer to FIG. 1) of the operating device D. In normal control, the drive controller 46 drives the electric actuator 24 by electric power of at least one of the power supply 16 and the power storage 28. In normal control, the drive controller 46 operates the electric actuator 24 by electric power of the power supply 16 and electric power of the power storage 28 based on the detection result of the state detector 18. In this manner, the electric power of the power supply 16 and the electric power of the power storage 28 are overlapped as necessary. Thus, the electric actuator 24 is stably operated. Emergency control is performed based on an input of the abnormal signal from the state detector 18. In emergency control, even in a case where there is no input of a signal from the operating portion D2, the drive controller 46 controls the brake device 12 so that the braking portion 26 brakes the rotary body H (refer to FIG. 1). In emergency control, the drive controller 46 controls the brake device 12 so as to brake the rotary body H that is rotating at a rotation speed higher than or equal to a predetermined rotation speed. Thus, in a case where the rotation speed of the rotary body H is lower than the predetermined speed, the user can move the human powered vehicle A. This ensures the convenience of the user. The predetermined rotation speed is set to be higher than a normal speed at which the user is assumed to walk the human powered vehicle A. In one example, the predetermined rotation speed is set to the rotation speed in a case where the user is walking the human powered vehicle A at 7 km per hour. Additionally, in emergency control, the drive controller 46 controls the brake device 12 so that the rotation speed of the rotary body H is reduced in a stepped manner. This limits a quick reduction of the rotation speed of the rotary body H. In emergency control, the drive controller 46 operates the electric actuator 24 by only electric power of the power storage 28. Thus, even in a case where the electric actuator 24 is not supplied with sufficient electric power from the power supply 16, the brake device 12 is drivable.

The charge controller 48 controls the charge state of the power storage 28 so that the power storage 28 maintains a state capable of supplying a predetermined electric power to the electric actuator 24. The predetermined electric power is electric power that is large enough for the braking portion 26 to brake rotary body H (refer to FIG. 1) and stop the rotary body H at least one time in a case where the drive controller 46 performs emergency control to drive the brake device 12. Preferably, the predetermined electric power is large enough for the braking portion 26 to brake the rotary body H and stop the rotary body H multiple times.

In a case where emergency control is performed in a state where the driving of the braking portion 26 by the electric actuator 24 is stopped, the maintenance mechanism 32 maintains the brake on the rotary body H. The maintenance mechanism 32 is configured to restrict the driving of the braking portion 26 caused by input from the rotary body H. Thus, the configuration of the maintenance mechanism 32 is simplified. As shown in FIG. 3, the maintenance mechanism 32 is arranged between the output shaft 24A of the electric actuator 24 and the bolt 42 of the force transmission mechanism 40. The maintenance mechanism 32 allows transmission of rotational force to the bolt 42 from a side of the electric actuator 24 (upstream side) with respect to the maintenance mechanism 32. The maintenance mechanism 32 restricts transmission of rotational force to the bolt 42 from a side of the bolt 42 (downstream side) with respect to the maintenance mechanism 32. The maintenance mechanism 32 is configured to be manually set from a first state (refer to FIG. 3) in which the brake on the rotary body H is maintained by the braking portion 26 to a second state (refer to FIG. 4) in which the brake applied by the braking portion 26 to the rotary body H is released. The output shaft 24A of the electric actuator 24 is provided with a user operating portion 24B. In the first state shown in FIG. 3, the user rotates the user operating portion 24B of the output shaft 24A so that the bolt 42 is rotated in the second direction to change the maintenance mechanism 32 to the second state shown in FIG. 4. Thus, the user can easily change the maintenance mechanism 32 from the first state to the second state.

The notification device 22 shown in FIG. 2 reports the braking operation of the braking portion 26 performed on the rotary body H based on emergency control of the drive controller 46. In a case where the drive controller 46 performs emergency control, the notification device 22 notifies the user that emergency control is performed based on at least one of sound, light, and vibration. The notification device 22 is arranged, for example, on the handlebar A2 (refer to FIG. 1) together with the operating device D.

The electric brake system 10 and the brake device 12 have the effect and advantages descried below. The electric actuator 24 is driven using electric power of the power storage 28 in accordance with the power supply state from the power supply 16. Thus, it is possible to brake the rotary body H of the human powered vehicle A appropriately in various situations.

Another operation of the electric brake system 10 will now be described. The drive controller 46 of the electric brake system 10 controls drive states of the brake device 12 and a further device based on the detection result of the state detector 18. The drive controller 46 decreases the supply of electric power to the further device based on a detection of a decrease in the output of the power supply 16 by the state detector 18. Thus, the brake device 12 is maintained in a drivable state. The drive controller 46 stops the supply of electric power to the further device based on a state in which the state detector 18 detects that the output of the power supply 16 is lower than a threshold value. Thus, the brake device 12 is further assuredly maintained in a drivable state. In a case where the state detector 18 detects that the output of the power supply 16 is lower than the threshold value, the state detector 18 sends an abnormal signal to the drive controller 46. The drive controller 46 performs emergency control based on the input of the abnormal signal.

The electric brake system 10 has the effect and advantages described below. The drive controller 46 controls the supply of electric power from the power supply 16 to the brake device 12 and the further device based on the detection result of the state detector 18. Thus, it is possible to brake the rotary body H of the human powered vehicle A appropriately in various situations.

The invention claimed is:

1. An electric brake system applicable to a human powered vehicle, the electric brake system comprising:
   a brake device including:
      an electric actuator operated by electric power from a power supply; and
      a braking portion driven by the electric actuator to brake a rotary body of the human powered vehicle;
      an emergency state detector detecting an emergency state of the human powered vehicle other than an operation of the brake device performed by a user; and
      a control unit controlling the brake device so that (i) a rotation speed of the rotary body is reduced in a stepped manner based on the detection of the emergency by the emergency state detector, and (ii) the reduction of the speed of the rotary body stops at a first predetermined rotation speed that is equivalent to a walking speed of a human.

2. The electric brake system according to claim 1, wherein the control unit controls the brake device to brake the rotary body rotating at a rotation speed that is higher than or equal to a second predetermined rotation speed based on the detection result of the emergency state detector.

3. The electric brake system according to claim 1, wherein the braking portion includes a friction member pressed against the rotary body.

4. The electric brake system according to claim 3, wherein
   the friction member includes a first friction member and a second friction member arranged to face the first friction member with the rotary body disposed between the first friction member and the second friction member, and
   the braking portion further includes a first forward-reverse mechanism moving the first friction member forwardly and reversely with respect to the rotary body.

5. The electric brake system according to claim 4, wherein the braking portion further includes a second forward-reverse mechanism moving the second friction member forwardly and reversely with respect to the rotary body.

6. The electric brake system according to claim 1, wherein the emergency state detector detects a state related to output of the power supply.

7. The electric brake system according to claim 1, further comprising:
   a power storage provided separately from the power supply to supply electric power to the electric actuator.

8. The electric brake system according to claim 7, further comprising a charge controller controlling a charge state of the power storage so that the power storage maintains a state capable of supplying a predetermined electric power to the electric actuator.

9. The electric brake system according to claim 7, wherein the power supply includes a rechargeable battery.

10. The electric brake system according to claim 7, wherein the power supply includes an electric power generator generating electric power in accordance with traveling of the human powered vehicle.

11. The electric brake system according to claim 7, wherein the brake device further includes a base provided with at least one of the electric actuator, the braking portion, and the power storage.

12. The electric brake system according to claim 1, wherein the power supply is configured to supply electric power to the electric actuator and a further device other than the electric actuator.

13. The electric brake system according to claim 12, wherein the further device includes an assist device assisting propulsion of the human powered vehicle.

14. The electric brake system according to claim 1, wherein the rotary body is a rotor provided on a wheel of the human powered vehicle.

15. The electric brake system according to claim 1, wherein the brake device includes a maintenance mechanism maintaining a brake on the rotary body in a state where driving of the braking portion by the electric actuator is stopped.

16. The electric brake system according to claim 15, wherein the maintenance mechanism is configured to be manually set from a first state in which a braking force on the rotary body is maintained by the braking portion to a second state in which the braking force applied by the braking portion to the rotary body is released.

17. The electric brake system according to claim 15, wherein the maintenance mechanism is configured to restrict driving of the braking portion caused by input from the rotary body.

18. The electric brake system according to claim 1, further comprising a notification device reporting a braking operation of the braking portion performed on the rotary body based on control of the control unit.

19. The electric brake system according to claim 1, wherein the walking speed of a human is about 7 km per hour.

* * * * *